US006998729B1

(12) United States Patent
Wobben

(10) Patent No.: US 6,998,729 B1
(45) Date of Patent: Feb. 14, 2006

(54) WIND ENERGY PLANT HAVING AN OBSERVATION PLATFORM

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 59 days.

(21) Appl. No.: 10/221,337

(22) PCT Filed: Nov. 28, 2000

(86) PCT No.: PCT/EP00/11867

§ 371 (c)(1),
(2), (4) Date: Jan. 28, 2003

(87) PCT Pub. No.: WO01/69082

PCT Pub. Date: Sep. 20, 2001

(30) Foreign Application Priority Data

Mar. 17, 2000 (DE) .......................... 200 04 822 U

(51) Int. Cl.
*F03B 13/00* (2006.01)
*H02P 9/04* (2006.01)
*F03D 9/00* (2006.01)

(52) U.S. Cl. ............................ 290/54; 290/44; 290/53; 290/55

(58) Field of Classification Search ............ 290/53–55, 290/44
See application file for complete search history.

(56) References Cited

U.S. PATENT DOCUMENTS

| | | | | |
|---|---|---|---|---|
| 2,358,704 A * | 9/1944 | Goudy | ...................... | 52/236.1 |
| 3,125,189 A * | 3/1964 | Graham | ......................... | 52/65 |
| 3,156,017 A * | 11/1964 | Faerber | ......................... | 52/65 |

(Continued)

FOREIGN PATENT DOCUMENTS

| | | |
|---|---|---|
| CA | 232283 | 4/1920 |

(Continued)

OTHER PUBLICATIONS

"Wind Turbine System," McGraw-Hill Encyclopedia of Science & Technology, 1987, vol. 16, pp. 579-581.

*Primary Examiner*—Darren Schuberg
*Assistant Examiner*—Pedro J. Cuevas
(74) *Attorney, Agent, or Firm*—Seed IP Law Group PLLC

(57) ABSTRACT

The invention concerns a wind power installation comprising a rotor which is coupled to a generator within a machine housing. Such wind power installations have already long been known, for example the wind power installations of types E-40 and E-66 from Enercon, Aurich.

The object of the invention is to improve sightseeing options of a wind power installation, in which respect more people than previously can view such wind power installations.

A wind power installation comprising a rotor which is coupled to a generator within a machine housing, characterised in that an observation platform is arranged below the machine housing on the pylon of the wind power installation and is fixed by means of a support structure to the pylon of the wind power installation, wherein the support structure comprises an upper carrier arrangement and a lower carrier arrangement, wherein each carrier arrangement comprises a plurality of substantially identically formed support arms which are distributed around the periphery of the pylon, that the observation platform substantially completely surrounds the pylon, that the upper support arm arrangement carries a roof of the observation platform, that the lower support arm structure carries a floor of the observation platform, that the upper and the lower carrier arrangements receive holding means for windows which are distributed over the periphery of the observation platform and permit the user of the observation platform, in use of the observation platform, to have a panoramic view over the landscape.

13 Claims, 3 Drawing Sheets

U.S. PATENT DOCUMENTS

| | | | | | |
|---|---|---|---|---|---|
| 3,633,904 | A | * | 1/1972 | Kojima | 472/2 |
| 3,895,473 | A | * | 7/1975 | Fraser | 52/745.04 |
| 3,895,495 | A | * | 7/1975 | Akazaki et al. | 405/200 |
| 4,008,006 | A | | 2/1977 | Bea | 417/271 |
| 4,266,911 | A | * | 5/1981 | Helm et al. | 416/9 |
| 4,291,233 | A | * | 9/1981 | Kirschbaum | 290/1 C |
| 4,557,666 | A | * | 12/1985 | Baskin et al. | 416/32 |
| 4,565,929 | A | * | 1/1986 | Baskin et al. | 290/44 |
| 4,644,707 | A | * | 2/1987 | Aubourg et al. | 52/65 |
| 4,692,094 | A | * | 9/1987 | Kulinyak | 416/11 |
| 5,140,865 | A | * | 8/1992 | Foster | 37/403 |
| 5,200,759 | A | * | 4/1993 | McGinnis | 343/890 |
| 5,396,741 | A | * | 3/1995 | Adlam | 52/40 |
| 5,506,453 | A | * | 4/1996 | McCombs | 290/44 |
| 5,522,186 | A | * | 6/1996 | Jarman | 52/73 |
| 6,320,272 | B1 | * | 11/2001 | Lading et al. | 290/44 |
| 6,361,275 | B1 | * | 3/2002 | Wobben | 416/33 |
| 6,400,039 | B1 | * | 6/2002 | Wobben | 290/44 |
| 6,407,900 | B1 | * | 6/2002 | Shirakawa et al. | 361/117 |
| 6,408,575 | B1 | * | 6/2002 | Yoshida et al. | 52/40 |
| 6,592,331 | B1 | * | 7/2003 | Wobben | 416/244 R |
| 6,710,468 | B1 | * | 3/2004 | Marrero O'Shanahan | 290/55 |

FOREIGN PATENT DOCUMENTS

| | | | | |
|---|---|---|---|---|
| CA | 2402905 | | | 9/2001 |
| DE | 2 138 500 | | | 2/1973 |
| DE | 200 06 959 | U1 | | 7/2000 |
| DE | 20205396 | U1 | * | 11/2002 |
| JP | 60-203720 | | | 10/1985 |
| JP | 01-077761 | | | 3/1989 |
| JP | 02123557 | A | | 5/1990 |
| JP | 3-76962 | | | 8/1991 |
| JP | 4-56866 | | | 5/1992 |
| JP | 10127948 | A | * | 5/1998 |
| JP | 2000282713 | A | * | 10/2000 |
| JP | 2002180699 | A | * | 6/2002 |

* cited by examiner

WIND ENERGY PLANT HAVING AN OBSERVATION PLATFORM

The invention concerns a wind power installation comprising a rotor which is coupled to a generator within a machine housing. Such wind power installations have already long been known, for example the wind power installations of types E-40 and E-66 from Enercon, Aurich.

Wind power installations and in particular wind parks with a large number of wind power installations have in the meantime been technically developed to such an extent that they make a relevant contribution to electrical energy production. It is precisely wind parks and relatively large individual installations that are impressive structures which readily lend themselves as the object of sightseeing tours, especially as wind power represents an interesting technology which arouses interest in very large numbers of people.

The object of the invention is to improve sightseeing options of a wind power installation, in which respect more people than previously can view such wind power installations.

In accordance with the invention that object is attained by a wind power installation having the features of claim 1. The advantageous development thereof is set forth in the appendant claims.

The wind power installation according to the invention is provided with an observation platform which is arranged beneath the machine housing on the pylon of the wind power installation. The observation platform is fixed directly to the pylon and comprises an upper carrier arrangement comprising a plurality of support arms and a lower carrier arrangement, also comprising support arms. Access to the observation platform can be by way of ladders, stairs or elevators in or on the pylon.

The observation platform according to the invention is extremely attractive for visitors to wind power installations, in particular visitors to wind parks, because it not only permits viewing of an individual installation or a plurality of installations from the worm's-eye view, but also guarantees a view from approximately hub height (machine housing height) and thus, particularly in regions without hills and mountains, a highly attractive landscape perspective as well as the possibility of viewing the wind power installation. In accordance with the invention, a closed structure is provided for the observation platform, that is to say the entire observation platform is closed by glass walls and roofs and thus a visit to the observation platform is still pleasant even when it is very windy and very cold.

In order to have a good outlook from the observation platform it is preferably arranged directly beneath the machine housing so that the rotor blades move past the observation platform in operation under the effect of wind force. It is however also certainly possible for the observation platform to be mounted to the pylon in such a way that it is always beneath the rotor.

The invention is described hereinafter by means of an example illustrated in greater detail in the drawing in which.

Figure 1:
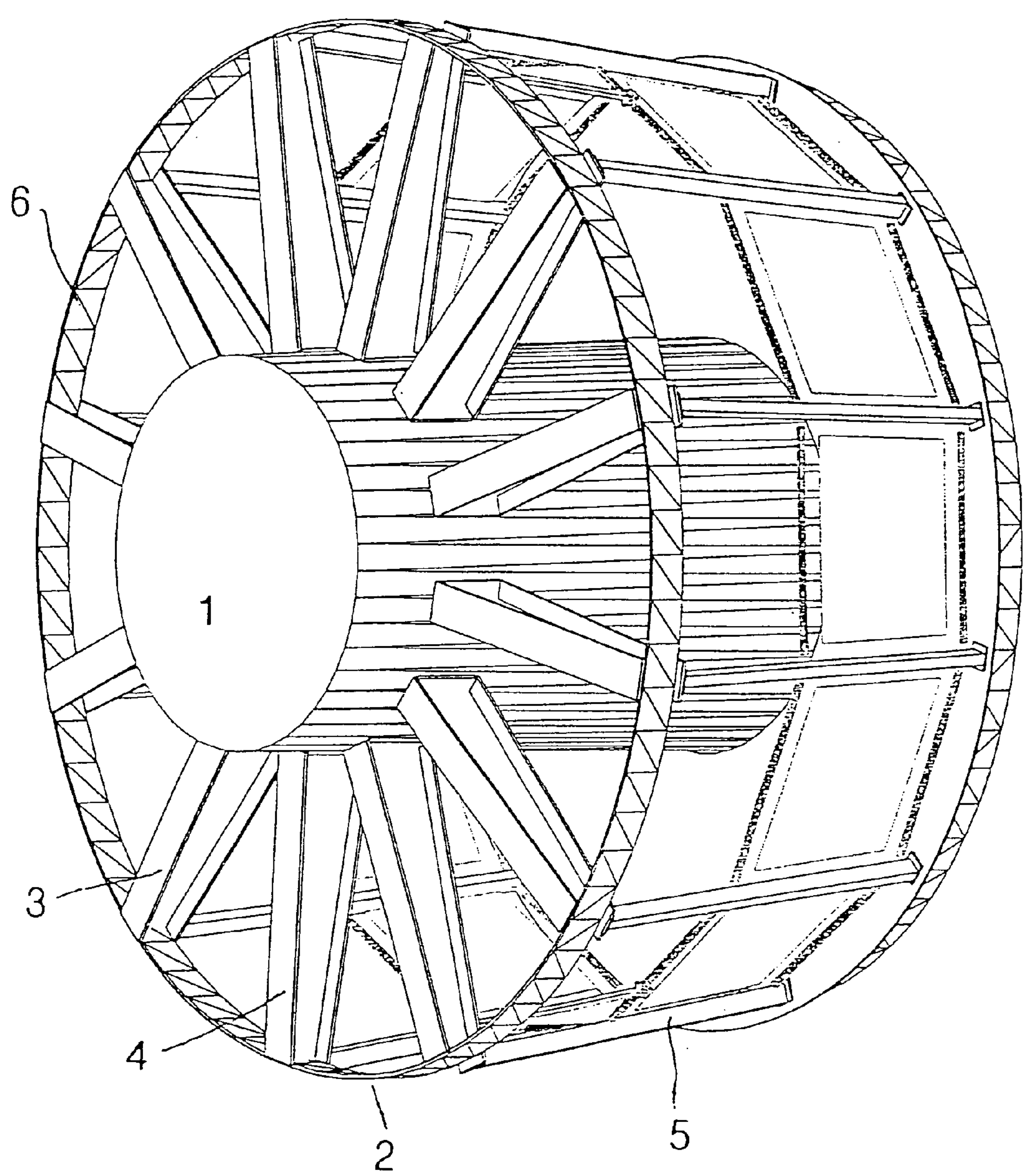
FIG. 1 shows a top view on to and a view into an observation platform.

FIG. 1 shows the pylon 1 of a wind power installation to which an observation platform 2 is fixed. The observation platform comprises a support structure, comprising an upper carrier arrangement 3 with a plurality of support arms 4 and a lower carrier arrangement (see FIG. 2), also with a plurality of support arms. In this case, associated with a support arm on the upper carrier arrangement, vertically therebeneath, is a respective support arm of the lower carrier arrangement, and the support arms which are disposed vertically one above the other are connected by means of connecting portions 5. Provided between the connecting portions are glass walls which permit a view out of the observation platform. The lower carrier arrangement carries the floor of the observation platform while the upper carrier arrangement carries the roof, in particular consisting of transparent material. Adjacent support arms of the upper carrier arrangement (like also adjacent support arms of the lower carrier arrangement) are also connected together by connecting portions 6. The support arms comprise a double-T-profile iron member and are screwed to the pylon which preferably comprises steel.

Figure 2:
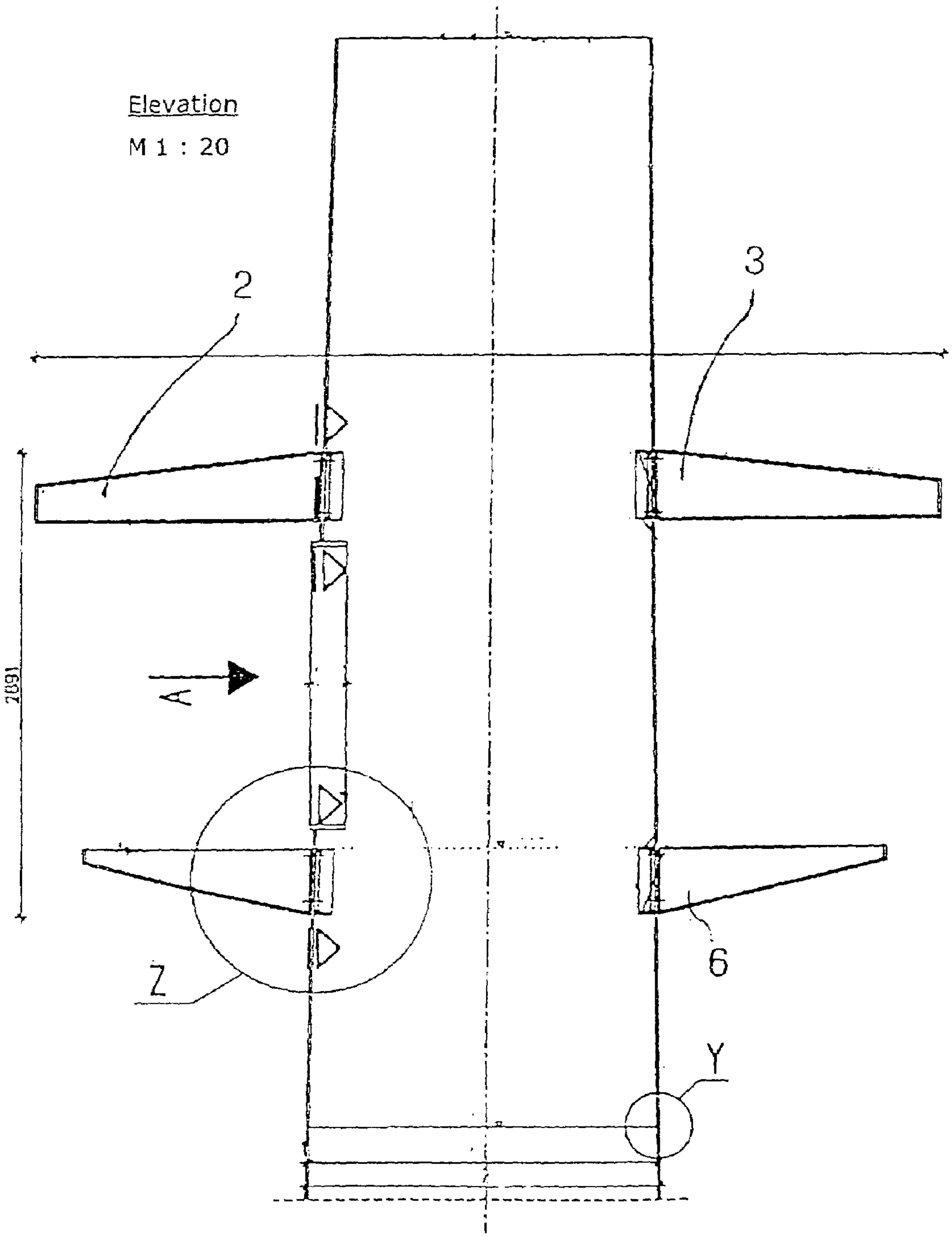
FIG. 2 shows a view in cross-section through the support structure of the observation platform.
Figure 3:
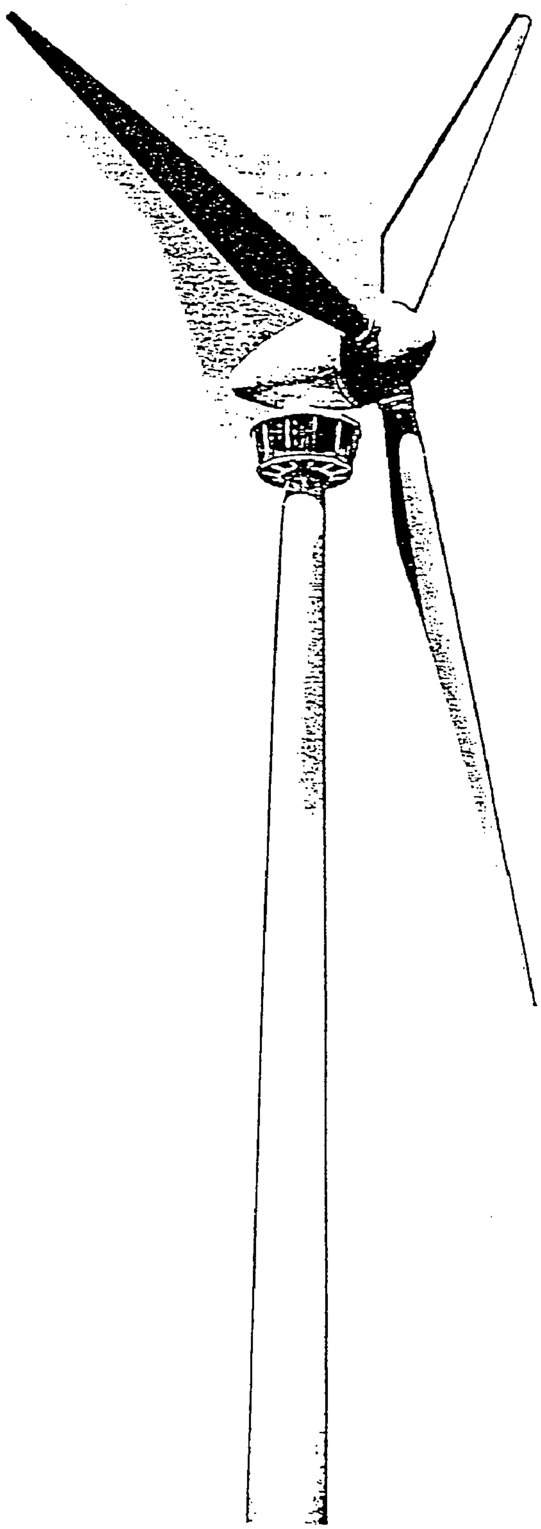
FIG. 3 shows a view of a wind power installation with an observation platform.

FIG. 2 is a view in cross-section showing the carrier structure of the observation platform 2. The upper carrier arrangement 3 and the lower carrier arrangement 6 can be seen here. In the illustrated example each carrier arrangement comprises twelve support arms 4 which are distributed uniformly around the periphery. The support arms of the upper carrier arrangement are longer in this case (that is to say their tip is further away from the pylon) than the length of the support arms of the lower carrier arrangement. That makes it possible for the windows to be provided in the observation platform in an inclined position in such a way that it is possible for the user also to have a view directly on to the ground if the floor itself is not already made from transparent material, for example glass.

Access to the observation platform which embraces the entire pylon is through an opening in the pylon wall. It is possible in that way to provide an elevator within the pylon so that users can comfortably and conveniently reach the observation platform with the elevator.

The size of the observation platform is such that only a limited number of people can stay there so that the stability and the safe mounting of the observation platform are also guaranteed at any time. To reinforce the mounting of the support arms, the support arms can be welded to the pylon or it is also possible to provide further holding means.

If the roof of the observation platform is made from transparent material, for example glass, it is possible for the user of the observation platform also to observe the machine housing and the rotor with its rotor blades above the observation platform.

To provide better information the observation platform can also be equipped with measuring devices which provide the user of the observation platform with further data about the wind power installation itself or other wind power installations. Such data can also be the wind data at various locations of the wind power installation, as well as power data and so forth.

If such a wind power installation is disposed in a wind park it is highly attractive for the wind power installation to be so disposed within the wind park that all wind power installations of the wind park can be observed from the observation platform.

The entire observation platform can be provided with sound insulation so that external noise and in particular the noise of the wind power installation penetrates into the observation platform only to a slight degree, so that a conversation is also readily possible there. It will be appreciated that it can also be provided, so that the visitor to the observation platform enjoys conditions which are as real as possible, that there are no sound insulating measures whatsoever, so that the wind which whistles past at the height of the observation platform, like also the noise of the wind power installation and the parts thereof (in particular the generator) can be readily heard on the observation platform.

Instead of being statically fixed to the pylon the observation platform can also be mounted rotatably about the pylon, for which purpose a motor drive is then provided for rotating the observation platform around the pylon.

The observation platform of the wind power installation can also be used for fire observation purposes. In that case the structure according to the invention represents an extremely inexpensive structure which does not require the separate erection of a fire observation tower. As in the meantime many wind power installations are also being set up at inland sites, a wind power installation according to the invention permits highly efficient fire observation in the hot season.

The invention claimed is:

1. A wind power installation comprising: a rotor which is coupled to a generator within a machine housing; an observation platform arranged below the machine housing on a pylon of the wind power installation and fixed by means of a support structure to the pylon of th4e wind power installation, wherein the support structure comprises an upper carrier arrangement and a lower carrier arrangement, wherein each carrier arrangement comprises a plurality of substantially identically formed support arms which are distributed around the periphery of the pylon, such that the observation platform substantially surrounds the pylon, the upper support arm arrangement carries a roof of the observation platform, the lower support arm structure carries a floor of the observation platform, the upper and the lower carrier arrangements receive holding means for windows which are distributed over the periphery of the observation platform and permit the user of the observation platform, in use of the observation platform, to have a panoramic view over the landscape.

2. The wind power installation as set forth in claim 1 wherein the support arms of the upper carrier arrangement are longer than the support arms of the lower carrier arrangement.

3. The wind power installation as set forth in claim 1 wherein the support arms are affixed to the pylon and the wind power installation and the pylon in the region of the observation platform comprises steel and/or concrete.

4. The wind power installation as set forth in claim 1 wherein the lower and the upper carrier arrangement respectively comprise twelve support arms, wherein associated with an upper support arm vertically therebeneath is a lower support arm.

5. The wind power installation as set forth in claim 1 wherein the access to the observation platform comprises a ladder, a stairway or an elevator within or outside the pylon.

6. The wind power installation as set forth in claim 1 wherein the spacing between the observation platform and the machine housing of the wind power installation is less than the spacing between the rotor blade tip of a rotor blade and the rotor blade hub.

7. The wind power installation as set forth in claim 1 wherein the spacing of the observation platform relative to the machine housing is greater than the spacing between a rotor blade tip of a rotor blade and a rotor blade hub.

8. The wind power installation as set forth in claim 1 wherein the windows of the observation platform are so inclined that an upper edge of the windows is further away from the pylon than a lower edge.

9. The wind power installation as set forth in claim 1 wherein the observation platform is mounted rotatably about the pylon and is rotatable preferably by a motor drive about the pylon.

10. The wind power installation as set forth in claim 1 wherein the observation platform has acoustic sound insulation which very substantially prevents the penetration of external noise into the observation platform, in particular the noise produced by the wind power installation.

11. A wind park comprising a plurality of wind power installations, wherein one of those wind power installations is fitted with an observation platform as set forth in claim 1 and said installation with the observation platform is enclosed within the wind park by a plurality of wind power installations.

12. The wind park in particular as set forth in claim 11 wherein the wind power installation with the observation platform is so arranged within the wind park that the majority of wind power installations of the wind park and preferably each wind power installation of the wind park is to be seen from the observation platform.

13. The wind power installation of claim 1 wherein the observation platform is a fire observation tower.

* * * * *